UNITED STATES PATENT OFFICE.

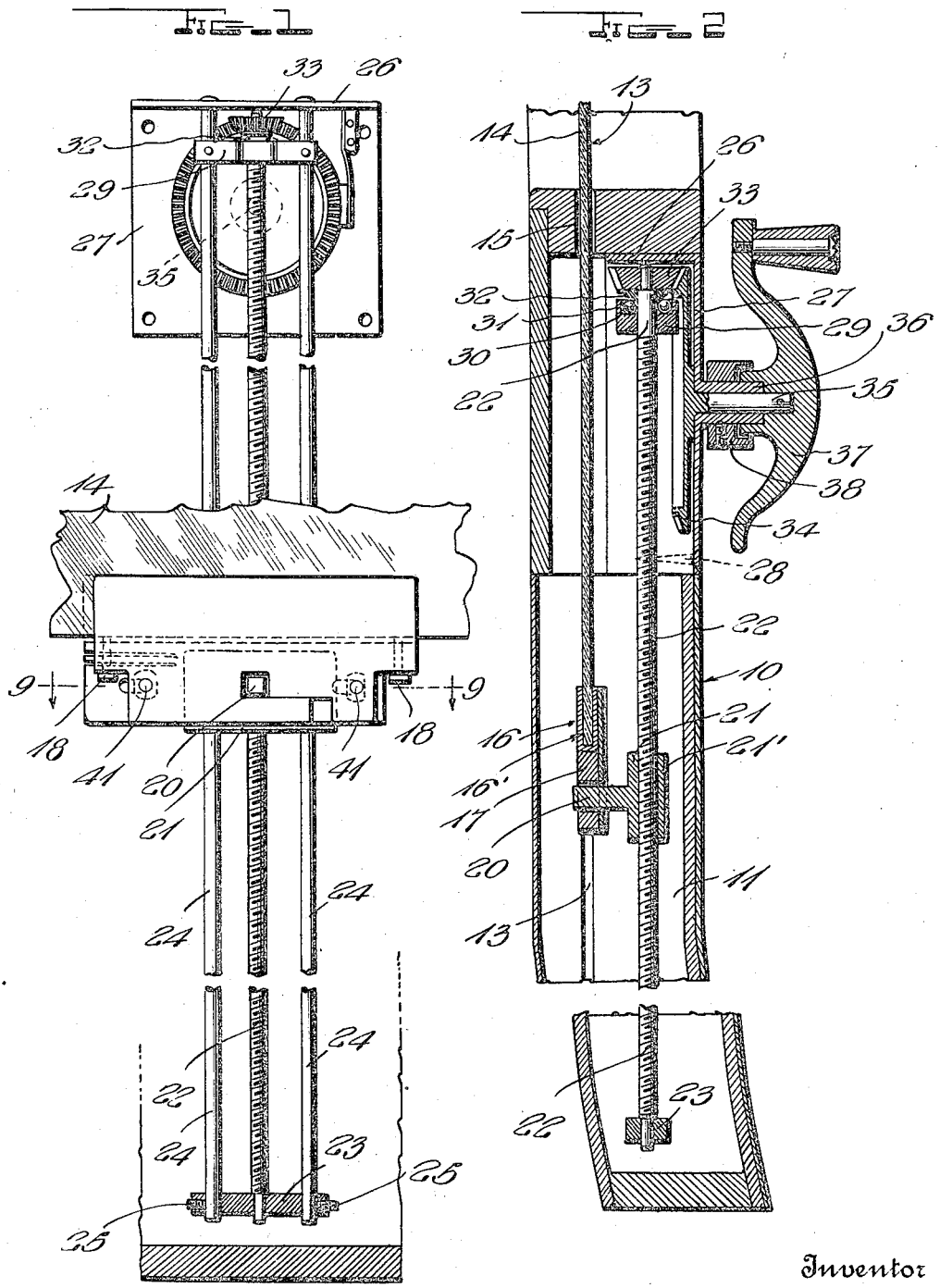

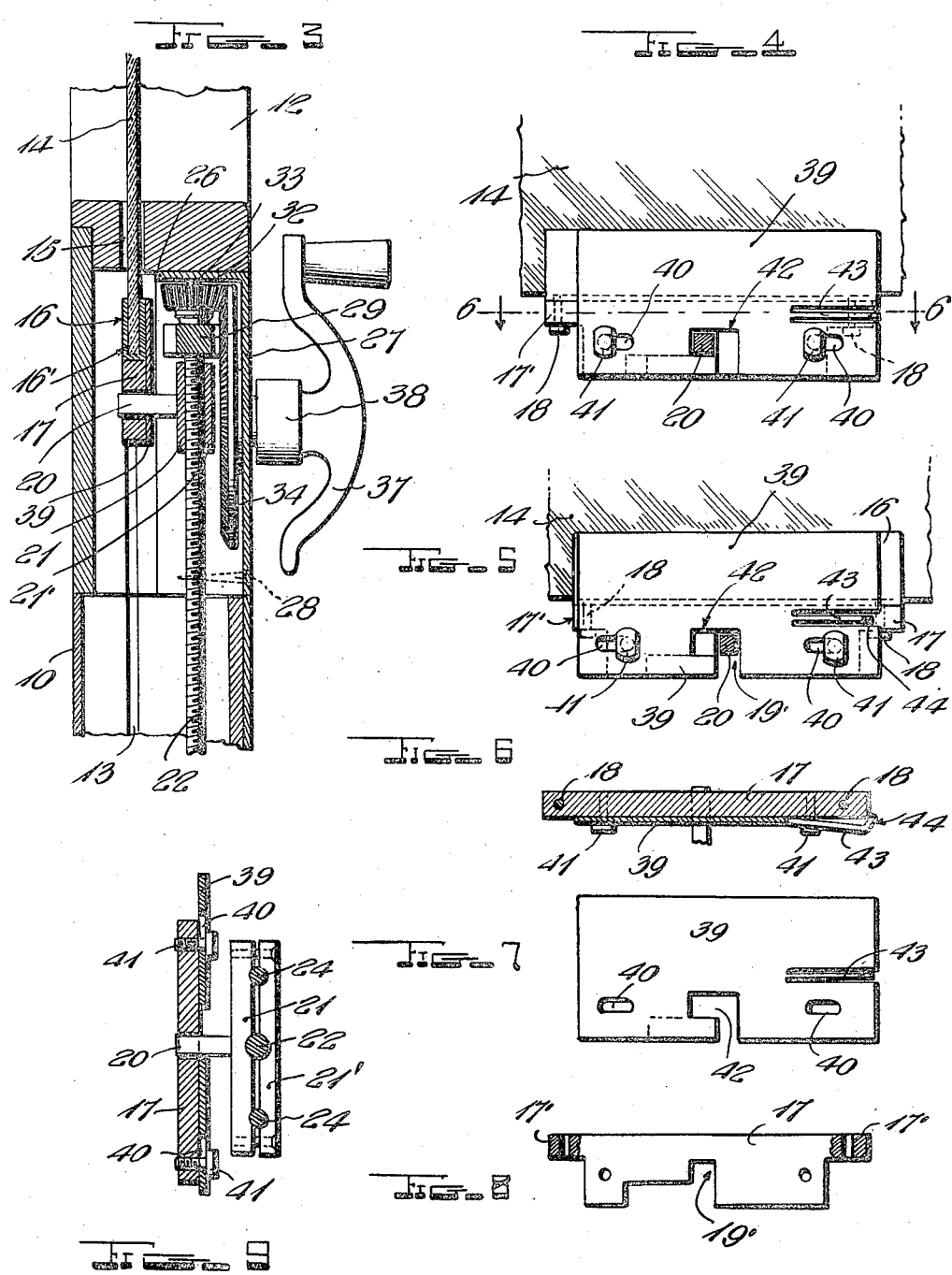

JOSEPH F. O'BRIEN, OF NEW YORK, N. Y.

WINDOW-CLOSURE.

1,310,367.　　　　Specification of Letters Patent.　　Patented July 15, 1919.

Application filed April 11, 1919. Serial No. 289,215.

*To all whom it may concern:*

Be it known that I, JOSEPH F. O'BRIEN, a citizen of the United States, and a resident of New York, in the county of New York, and State of New York, have invented new and useful Improvements in Window-Closures, of which the following is a specification.

This invention relates to window closures and is adapted to be used particularly in connection with the windows of automobile doors although not restricted to this use.

An important object of the invention is to provide in a device of the above mentioned character a means whereby the window with which the device is used may be easily and quickly moved to any desired position.

A further object of the invention is to provide in a device of the above mentioned character a means whereby certain supporting elements adapted for connection with the pane of glass may be easily removed or disassembled in order to permit the pane of glass to be readily removed should the glass accidentally or otherwise become broken.

A further object of the invention is to provide in a device of the above mentioned character a means whereby the supporting elements having connection with the pane of glass may be securely locked in an operative position.

Other objects and advantages of the invention will be apparent during the course of the following description taken in connection with the accompanying drawings, In the drawings, forming a part of this specification and in which like numerals are employed to designate like parts throughout the same, Figure 1 is a rear elevation of the device embodying my invention, Fig. 2 is a vertical tranverse sectional view through the device, the device being shown as assembled within an automobile door and connected with a pane of glass.

Fig. 3 is a similar view to Fig. 2, the pane of glass being shown as retained in an elevated position, Fig. 4 is a detail view showing certain supporting elements in a locked position, Fig. 5 is a similar view to that shown in Fig. 4, the certain elements thereof being shown in an unlocked position, Fig. 6 is a horizontal sectional view taken on line 6—6 of Fig. 4.

Fig. 7 is a face view of a plate.

Fig. 8 is a top plan view of a supporting element, and,

Fig. 9 is a horizontal sectional view taken on line 9—9 of Fig. 1.

In the drawings, wherein for the purpose of illustration is shown a preferred form of my invention, the numeral 10 indicates as a whole an automobile door such as is commonly employed in connection with automobile bodies of the limousine type. This door comprises a lower section 11 carrying a frame 12 which is provided with a slot 13 extending throughout the length of the same and into the lower section 11 as clearly shown in Figs. 2 and 3. The slot is adapted to receive therein a glass panel 14 extending through a slot 15 into the interior of the section 11. The lower portion of the glass panel 14 is arranged within a receiver 16 and is secured therein by suitable cement or the like as shown at 16'. This receiver is supported by a base 17 having ears 17' through which screws 18 or the like are passed, the screws being adapted to retain the receiver 16 in position upon the base 17. The base 17 is provided with an elongated slot 19' adapted to receive therein a boss 20 carried by a guide member 21. The guide member 21 together with a companion guide member 21' is mounted upon and has engagement with an externally screw-threaded shaft 22. The shaft is journaled within a cross bar 23 suitably held to vertically arrange guide bars 24 by means of set-screws 25. These guide bars extend upwardly between the guide members 21 and 21' and are secured at their upper ends to a flange 26 carried by a face plate 27, the flange 26 being arranged substantially at a right-angle to the plate 27. The plate 27 is adapted to be secured to the inner face of the door 10 by means of suitable screws 28 as clearly shown in Fig. 2. The screw-threaded shaft 22 is journaled at its upper end in either a second cross bar 29 having a ball-bearing channel 30 adapted to receive ball-bearings 31 which support the thrust bearing 32 secured to the shaft 22 by any suitable means. To the upper end of the shaft 22 there is secured a bevel gear 33 having engagement with a second bevel gear 34 carried by a stub-shaft 35 journaled within an elongated bearing 36 carried by the plate 27. To the shaft 35 there is secured a suitable crank 37 for rotating various elements as will hereinafter be described. Between the inner face of the crank 37 and the outer face of the plate 27 there is positioned a collar 38 which is adjustable on the bearing 36 and adapted to retain the gear 34 and shaft 35 in a desired position as is apparent when considering Fig. 2. Upon the base 17 there is arranged a slidable plate 39 which is provided with slots 40 adapted to receive screws or the like 41 which are retained in engagement with the base 19. The plate 39 is further provided with an L-shaped slot 42 adapted to receive the boss 20. As a means for locking the plate 39 in a desired position there is provided a spring tongue 43 having its end bent at right-angle as shown at 44 in order to engage the face of the base 17 when the plate is moved to the position shown in Fig. 5.

In assembling the device the plate 27 carrying the several coöperating elements is placed in position upon the bar as shown in Fig. 2.

In use, should it be desired to move the glass panel from the position shown in Fig. 2 to the position shown in Fig. 3 the crank 37 is rotated whereupon rotation is imparted to shaft 22. The rotating shaft 22 having screw-threaded engagement with the supporting members 21 and 21' lifts the base 17 together with the receiver 16 and other coöperating elements to the position shown in Fig. 3. If it is desired to lower the glass panel from the position shown in Fig. 3 to that shown in Fig. 2 it is necessary only to reverse the operation of the device as a whole. Heretofore it has been found difficult to remove the device as a whole to enable one to insert a new panel of glass should the old one for any reason whatsoever become broken. By the construction shown, described and claimed herein I am enabled to quickly remove a broken panel of glass from the door and insert a new one. In removing a broken panel from the door it is necessary only to move the receiver to the position shown in Fig. 3 whereupon the movable plate 39 is moved from the position shown in Fig. 4 to the position shown in Fig. 5 which unlocks the base 19 and permits the receiver together with the base to be lifted bodily upwardly, out of the lower section 11 through the slot 15. After having removed the base 17 together with the receiver 16 the broken portion of the panel may be removed from the receiver and a new one inserted therein and cemented as shown at 16' whereupon the receiver 16 together with the base 17 is inserted into the section 11 through the slot 15. When the receiver and base has passed through the slot 15 into the section 11 the base is placed upon the boss 20 in the position shown in Fig. 5 and then by any suitable instrument inserted through the slot 15 the movable plate 39 is moved to the position shown in Fig. 4 whereupon the hooked portion of the tongue 43 as shown at 44 engages the end of the base 19 as clearly shown in Fig. 6, thereby retaining the plate 39 in a locked position. By this arrangement it is apparent that the easy removal of glass panels and insertion of new ones for the old is made possible without having to remove the plate 27 from its position upon the door 10.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, what I claim as new and desire to secure and protect by Letters Patent of the United States, is:

1. In a window closure the combination with a door of a vertical movable panel, a reciprocating element, means for connecting the reciprocating element with said panel including a receiver, a base secured to said receiver, said base having sliding engagement with said reciprocating element, a movable plate carried by said base for locking said base against movement with respect to said reciprocating element, means for retaining said movable plate in a locked position, and means for reciprocating said reciprocating element whereby said panel is moved.

2. In a window closure the combination with an automobile door, of a vertically movable panel, a reciprocating element provided with a boss, means for connecting said panel and reciprocating element including a base provided with a slot adapted to receive said boss, means for locking said boss within said slot, the latter named means comprising a movable plate carried by said base, spring tension means for retaining said movable plate in a locked position, and means for reciprocating said reciprocating element whereby said panel is moved.

3. In a window closure the combination of a door, with a movable panel, a reciprocating element provided with a boss, means for connecting said panel with said reciprocating element including a receiver, a base connected with said receiver, said base being provided with a slot adapted to receive said boss, a movable plate carried by said base, said plate being provided with an L-shaped slot adapted to receive said boss, said plate being adapted to move to lock said boss within the first mentioned slot, means for retaining said plate in a locked position, and means for reciprocating said reciprocating element whereby said panel is moved.

JOSEPH F. O'BRIEN.